(12) United States Patent
Fujiwara

(10) Patent No.: US 12,466,456 B2
(45) Date of Patent: Nov. 11, 2025

(54) TRAVELING APPARATUS

(71) Applicant: SHARP KABUSHIKI KAISHA, Sakai (JP)

(72) Inventor: Yoichi Fujiwara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 262 days.

(21) Appl. No.: 18/122,626

(22) Filed: Mar. 16, 2023

(65) Prior Publication Data

US 2023/0322286 A1    Oct. 12, 2023

(30) Foreign Application Priority Data

Mar. 23, 2022    (JP) .................... 2022-046712

(51) Int. Cl.
*G05D 1/00* (2024.01)
*B62B 5/00* (2006.01)

(52) U.S. Cl.
CPC .......... *B62B 5/0069* (2013.01); *B62B 5/0093* (2013.01); *G05D 1/0263* (2013.01); *G05D 1/0274* (2013.01)

(58) Field of Classification Search
CPC ................................................. B62B 5/0069
See application file for complete search history.

(56) References Cited

U.S. PATENT DOCUMENTS

| | | | |
|---|---|---|---|
| 3,628,624 A * | 12/1971 | Wesener | G05D 1/0263 180/6.5 |
| 9,751,482 B1 * | 9/2017 | Brew | B60R 19/54 |
| 10,676,039 B2 * | 6/2020 | Oh | B60R 1/28 |
| 2019/0196001 A1 * | 6/2019 | Nemeth | G06V 10/143 |
| 2019/0250618 A1 * | 8/2019 | Batts | G05D 1/0274 |
| 2021/0009062 A1 * | 1/2021 | Andres | G01S 13/865 |
| 2022/0001872 A1 * | 1/2022 | Taieb | G06V 10/44 |
| 2022/0009526 A1 * | 1/2022 | Campanale | B60W 40/06 |
| 2022/0041210 A1 * | 2/2022 | Sakaguchi | B62D 15/0215 |

FOREIGN PATENT DOCUMENTS

| | | |
|---|---|---|
| JP | 2001-255936 A | 9/2001 |
| JP | 2016148921 A | 8/2016 |

* cited by examiner

*Primary Examiner* — Vivek D Koppikar
*Assistant Examiner* — Paul W Arellano
(74) *Attorney, Agent, or Firm* — ScienBiziP, P.C.

(57) ABSTRACT

In a traveling apparatus, multiple first detectors and multiple second detectors are arrayed in an intersectant direction intersecting a travel direction where a vehicle body travels. The second detectors are separated in the travel direction from the first detectors. The first detectors and the second detectors detect a guide extending on a road surface. A first interval between two first detectors adjacent to each other in the intersectant direction is smaller than a second interval between two second detectors adjacent to each other in the intersectant direction.

12 Claims, 13 Drawing Sheets

TRAVELING APPARATUS

INCORPORATION BY REFERENCE

Under 35 U. S. C. 119, this application claims the benefit of Japanese Patent Application No. 2022-46712, filed on Mar. 23, 2022, whose contents are herein incorporated by reference in their entirety.

BACKGROUND

The present disclosure relates to a traveling apparatus.

A self-propelled dolly is known as a traveling apparatus. The self-propelled dolly includes multiple detectors to detect a guide formed of a magnetic tape or the like. The detectors are arrayed in a travel direction where the self-propelled dolly travels and an intersectant direction. The intersectant direction refers to a direction intersecting the travel direction.

SUMMARY

A traveling apparatus according to the present disclosure includes a vehicle body, multiple first detectors, multiple second detectors, and a controller. The multiple first detectors are arrayed in an intersectant direction intersecting a travel direction where the vehicle body travels. The multiple first detectors detect a guide extending on a road surface. The multiple second detectors are arrayed in the intersectant direction in a position distant in the travel direction from the multiple first detectors. The multiple second detectors detect the guide. The controller exerts guided travel control to control travel of the vehicle body based on a result of detection by the multiple first detectors and the multiple second detectors. A first interval between two first detectors out of the multiple first detectors, the two first detectors being adjacent to each other in the intersectant direction, is smaller than a second interval between two second detectors out of the multiple second detectors, the two second detectors being adjacent to each other in the intersectant direction.

DETAILED DESCRIPTION

Figure 1:
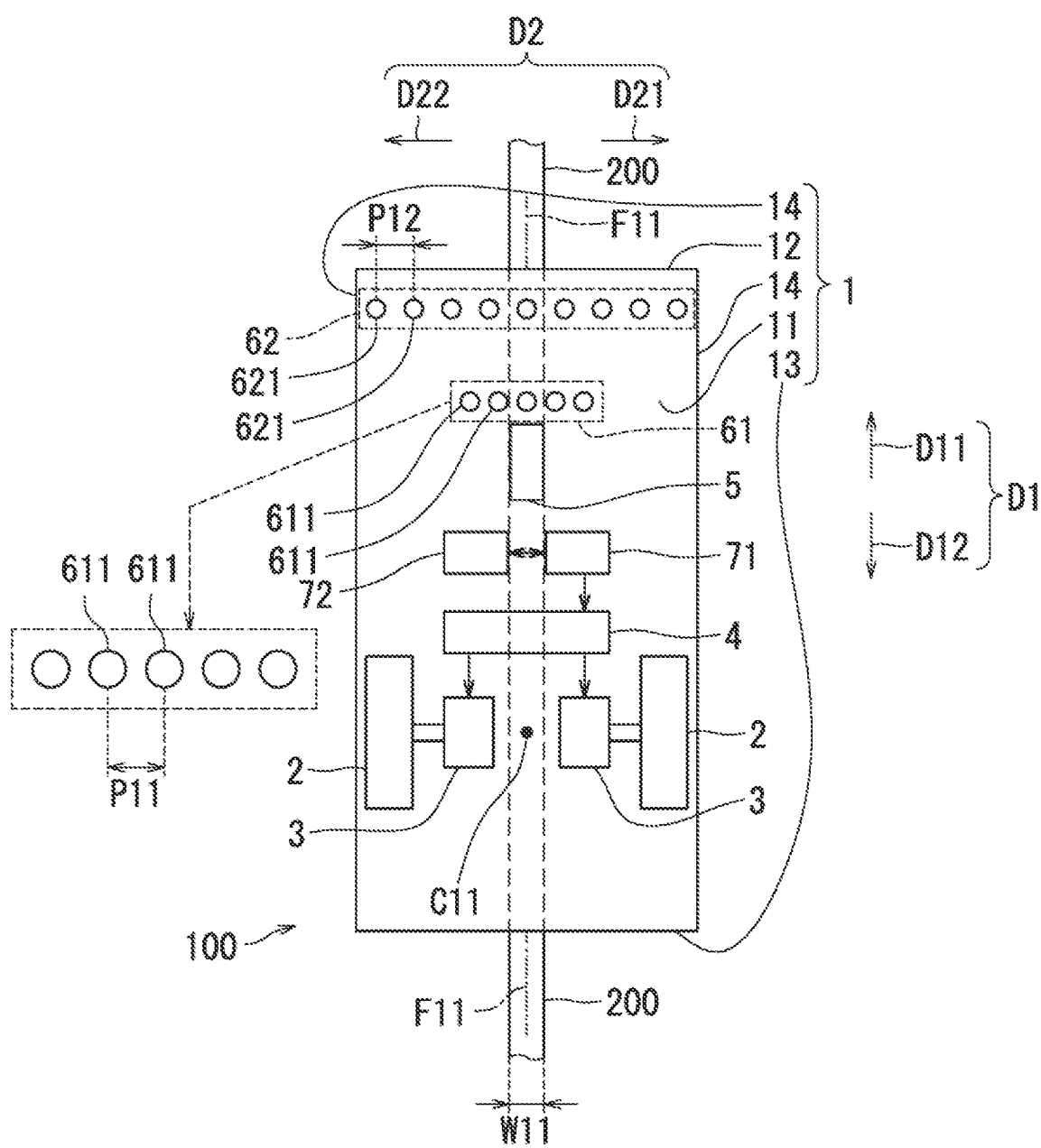
FIG. 1 is a bottom view of a traveling apparatus according to an embodiment of the present disclosure.

An embodiment of the present disclosure is described with reference to the drawings. In the drawings, parts that are identical or corresponding to one another are given the same reference sign so as not to repeat description.

Embodiment

Figure 2:
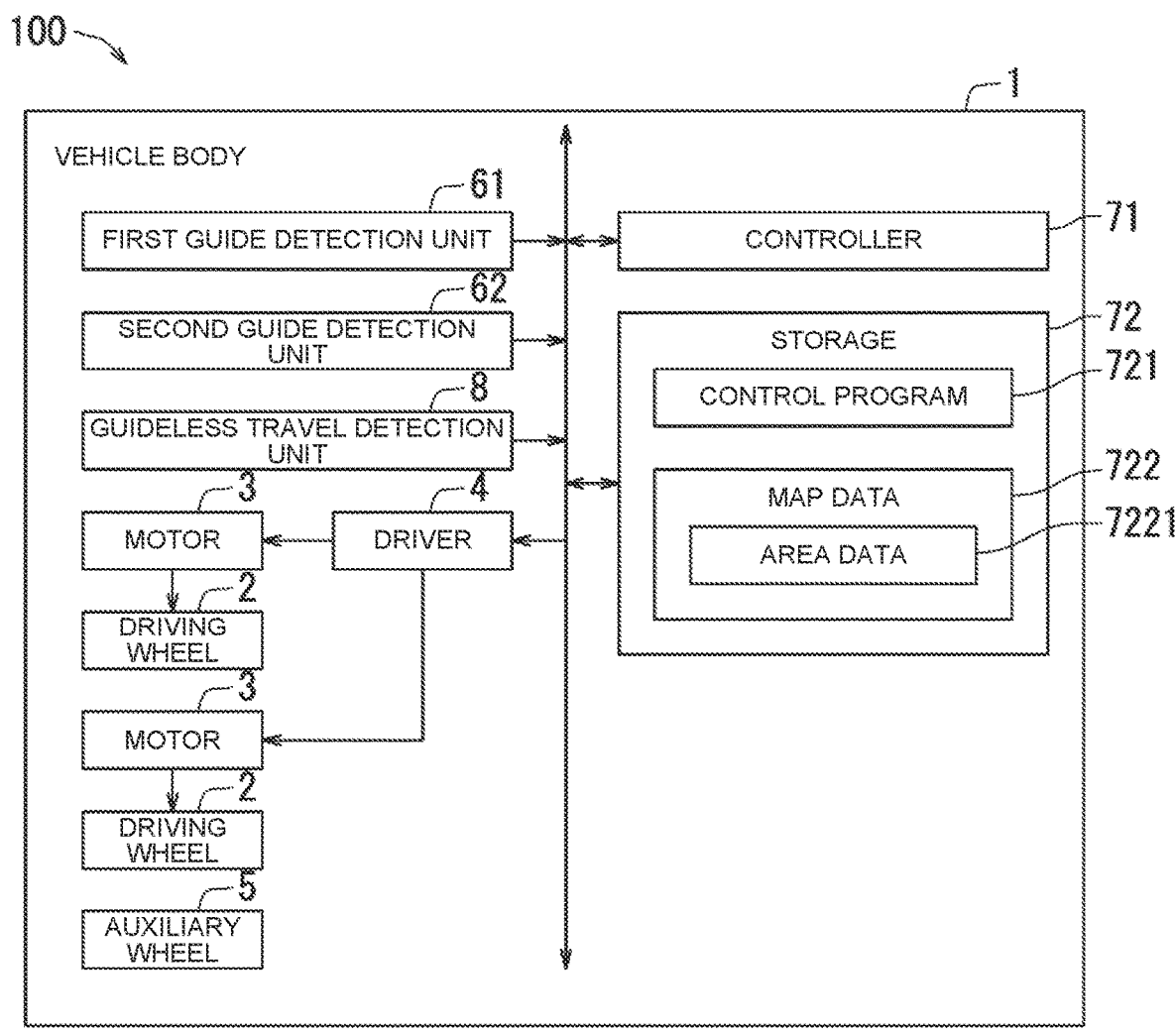
FIG. 2 is a block diagram of the traveling apparatus illustrated in FIG. 1.

FIG. 1 is a bottom view of a traveling apparatus 100 according to an embodiment of the present disclosure. In FIG. 1, a travel direction D1 where a vehicle body 1 included in the traveling apparatus 100 travels and an intersectant direction D2 are indicated. The intersectant direction D2 is a direction intersecting the travel direction D1 at right angles, and includes a direction to a right D21 and a direction to a left D22, with the right D21 and the left D22 being defined facing a front D11 in the travel direction D1. FIG. 2 is a block diagram of the traveling apparatus 100 illustrated in FIG. 1.

As seen from FIGS. 1 and 2, the traveling apparatus 100 is an unmanned conveyer vehicle used in a factory, a warehouse or the like. On a floor surface of the factory, warehouse or the like, a guide 200 is laid. In the embodiment, the guide 200 is constituted of a magnetic tape. The guide 200 extends along a travel route of the traveling apparatus 100. The guide 200 is 5 cm wide, for instance. The traveling apparatus 100 automatically travels while recognizing the guide 200. The factory and the warehouse are each an example of an "area" in the present disclosure. The floor surface is an example of a "road surface" in the present disclosure.

The traveling apparatus 100 includes the vehicle body 1. The vehicle body 1 has a bottom face 11, a front face 12, a rear face 13, and a pair of lateral faces 14. The bottom face 11 is substantially rectangular in planar view. The bottom face 11, the front face 12, the rear face 13, and the lateral faces 14 define an internal space of the vehicle body 1.

The traveling apparatus 100 includes a pair of driving wheels 2, a pair of motors 3, a driver 4, an auxiliary wheel 5, a first guide detection unit 61, a second guide detection unit 62, a controller 71, a storage 72, and a guideless travel detection unit 8. The driving wheels 2, the auxiliary wheel 5, the first guide detection unit 61, and the second guide detection unit 62 are provided on the vehicle body 1. The motors 3, the driver 4, the controller 71, and the storage 72 are provided in the internal space of the vehicle body 1. For convenience, the guideless travel detection unit 8 is not illustrated in FIG. 1.

The driving wheels 2 are separated from each other in the intersectant direction D2. Wheel shafts of the driving wheels 2 are parallel to the intersectant direction D2. Each driving wheel 2 is so supported on the vehicle body 1 as to be rotatable along with the wheel shaft of the relevant driving wheel 2.

In FIG. 1, a median plane F11 is illustrated. The median plane F11 is a virtual face that passes through a midpoint C11 of a line segment extending in the intersectant direction D2 between the driving wheels 2 when the traveling apparatus 100 takes a position of straightforward movement. The median plane F11 is parallel to the travel direction D1. In the following, being symmetrical in the intersectant direction D2 with respect to the median plane F11 is simply expressed "symmetrical".

The motors 3 are provided in symmetrical positions on the vehicle body 1, respectively, so as to correspond to the driving wheels 2. Each motor 3 includes a motor shaft parallel to the intersectant direction D2. The motor shaft is mechanically coupled to the wheel shaft of the driving wheel 2, which corresponds to the relevant motor 3.

The driver 4 outputs a driving signal to each of the motors 3. The motors 3 rotate based on the driving signals so as to give driving forces to the corresponding driving wheels 2. As a result, the traveling apparatus 100 moves straightforward, makes a normal turn, or makes a fixed position turn (so-called spin turn). The midpoint C11 is also a turn center during the fixed position turn. In the following, the turn center during the fixed position turn is also given a reference sign "C11".

The auxiliary wheel 5 is rotated along with a wheel shaft of the auxiliary wheel 5 by the travel of the traveling apparatus 100, with receiving no driving forces from the motors 3. The auxiliary wheel 5 is so fitted to the vehicle body 1 as to rotate about a vertical axis during the turning of the traveling apparatus 100, for instance.

The first guide detection unit 61 includes multiple first detectors 611. The first detectors 611 symmetrically stand in a row in the intersectant direction D2. In FIG. 1, five first detectors 611 are illustrated. For convenience, only two first detectors are given a reference sign "611".

The second guide detection unit 62 includes multiple second detectors 621. The second detectors 621 stand in a row in the intersectant direction D2 in a position on the bottom face 11 that is distant from the first guide detection unit 61 toward the front D11. Specifically, the second detectors 621 are arrayed along an edge in the front D11 (namely, a front edge) of the bottom face 11. In FIG. 1, nine second detectors 621 are illustrated. For convenience, only two second detectors are given a reference sign "621".

The first detectors 611 and the second detectors 621 are each located above the floor surface so as to be opposite to the floor surface and detect the guide 200. Specifically, the first detectors 611 and the second detectors 621 are each a magnetic sensor such as a Hall sensor having a magnetosensitive face to detect magnetism. The magnetic sensors are the same in specifications. Each magnetic sensor outputs a signal having a "Hi" level as a detection result if detecting magnetism. If detecting no magnetism, each magnetic sensor outputs a signal having a "Lo" level as a detection result. In the following, a result of detection by each of the first detectors 611 is referred to as "a first detection result" and a result of detection by each of the second detectors 621 is referred to as "a second detection result".

Magnetosensitive faces of two first detectors 611 adjacent to each other in the intersectant direction D2 are arrayed with an interval P11. Two second detectors 621 adjacent to each other in the intersectant direction D2 are arrayed with an interval P12. The intervals P11 and P12 are each a distance between centers of the two corresponding magnetosensitive faces, for instance. The interval P11 is 1 cm, for instance. The interval P12 is larger than the interval P11 and smaller than a width W11 of the guide 200. As an example, the interval P12 is 4 cm.

The density of the second detectors 621 is lower than the density of the first detectors 611. The density refers to the number of detectors per unit length in the intersectant direction D2. Therefore, the traveling apparatus 100 is reduced in manufacturing cost. The interval P11 is an example of a "first interval" in the present disclosure. The interval P12 is an example of a "second interval" in the present disclosure.

Since the interval P12 is smaller than the width W11 of the guide 200, some second detector 621 or other certainly detects the guide 200 if the second guide detection unit 62 is located above the guide 200.

Among the second detectors 621, a second detector 621 at an end in the intersectant direction D2 is outward in the intersectant direction D2 as compared with the first guide detection unit 61. Specifically, a second detector 621 at a right end is toward the right D21 as compared with a first detector 611 at a right end. A second detector 621 at a left end is toward the left D22 as compared with a first detector 611 at a left end. Consequently, a length in the intersectant direction D2 of the second guide detection unit 62 is longer than a length in the intersectant direction D2 of the first guide detection unit 61. As a result, if the traveling apparatus 100 turns along the guide 200, a second detector 621 at one end in the intersectant direction D2 detects the guide 200 early. In addition, the second detectors 621 as arrayed along the front edge of the bottom face 11 allow an earlier detection of the guide 200 during the turning of the traveling apparatus 100.

The guideless travel detection unit 8 includes a light detection and ranging (LiDAR) sensor, a camera, and a time of flight (ToF) sensor. The guideless travel detection unit 8 detects an obstacle existing around the traveling apparatus 100.

The controller 71 is constituted of a processor.

The storage 72 includes a random access memory (RAM), a read-only memory (ROM), and a flash memory.

The storage 72 stores map data 722. The map data 722 represents a map for the traveling apparatus 100, which is to travel in a factory. The map data 722 is generated by the controller 71 based on a simultaneous localization and mapping (SLAM) technology, for instance. The controller 71 uses a result of obstacle detection by the guideless travel detection unit 8 to generate the map data 722.

In the factory, an area (hereinafter referred to as "special area") that the traveling apparatus 100 is prohibited from coming into is settled. The special area is an area with a step or an obstacle where the traveling apparatus 100 is unable to travel, for instance. The map data 722 includes area data 7221 designating a position of the special area.

In the embodiment, the controller 71 is connected with the respective first detectors 611 through individual signal lines, and also connected with the respective second detectors 621 through individual signal lines. As a result, the controller 71 is capable of specifying the first detector 611, which is a sender of the first detection result, and specifying the second detector 621, which is a sender of the second detection result.

The controller 71 is further connected to the driver 4, the guideless travel detection unit 8, and the storage 72 so as to be capable of data communications.

The controller 71 executes a control program 721 stored in the storage 72 and thus controls respective parts of the traveling apparatus 100.

Figure 3:
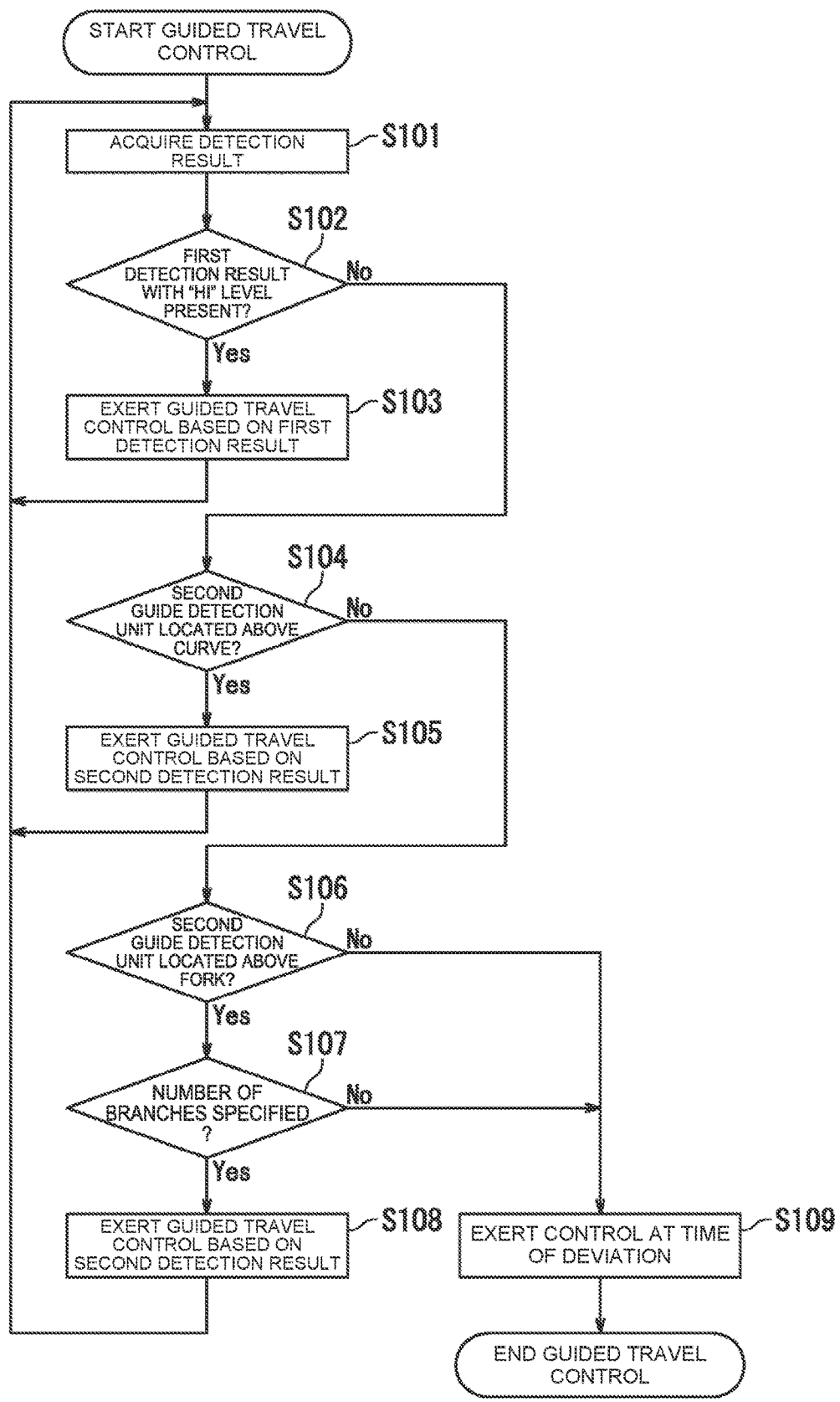
FIG. 3 is a flowchart illustrating a procedure of guided travel control by a controller illustrated in FIG. 2.
Figure 4:
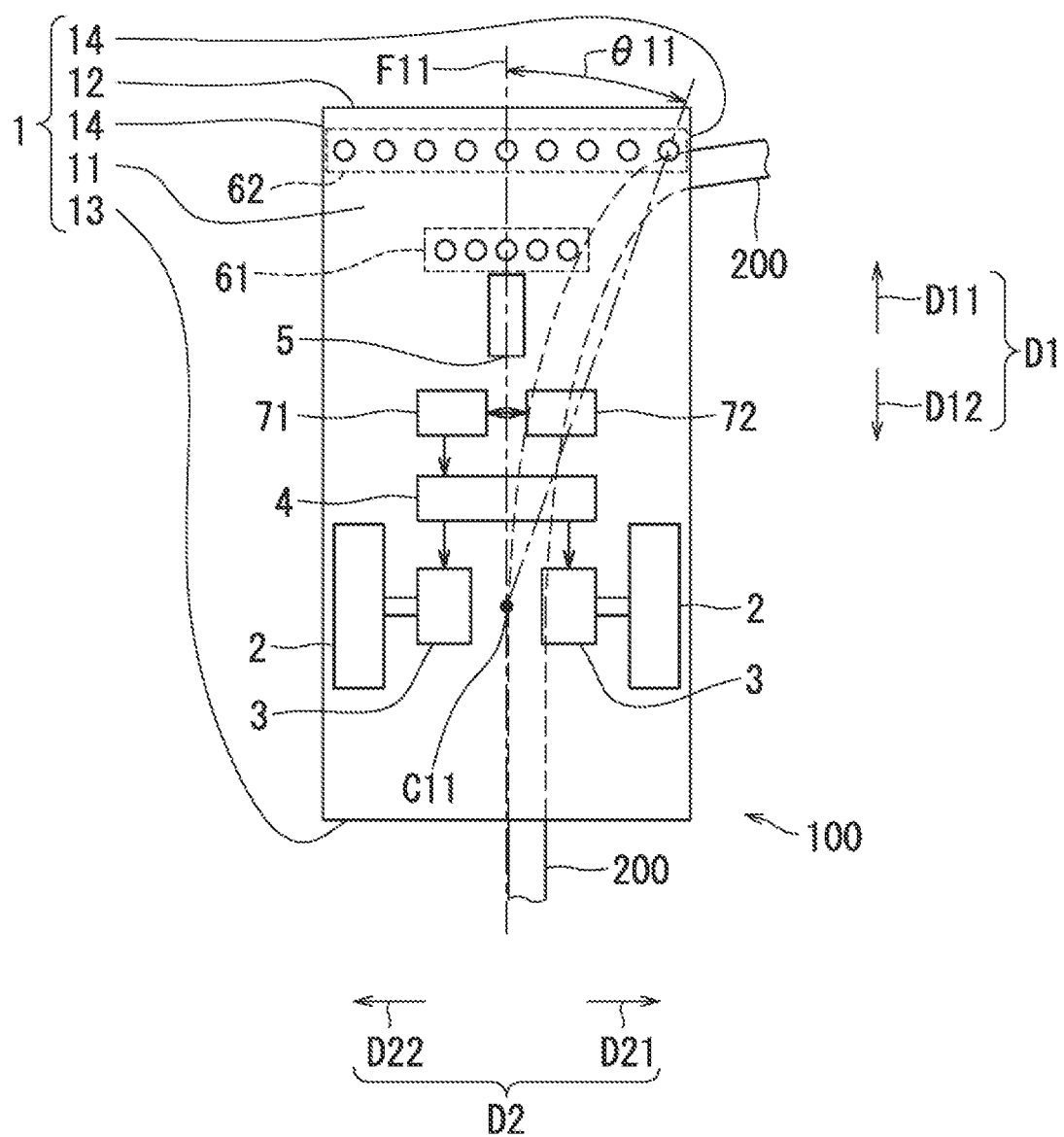
FIG. 4 is a diagram illustrating the traveling apparatus traveling on a linear section of a guide.
Figure 5:
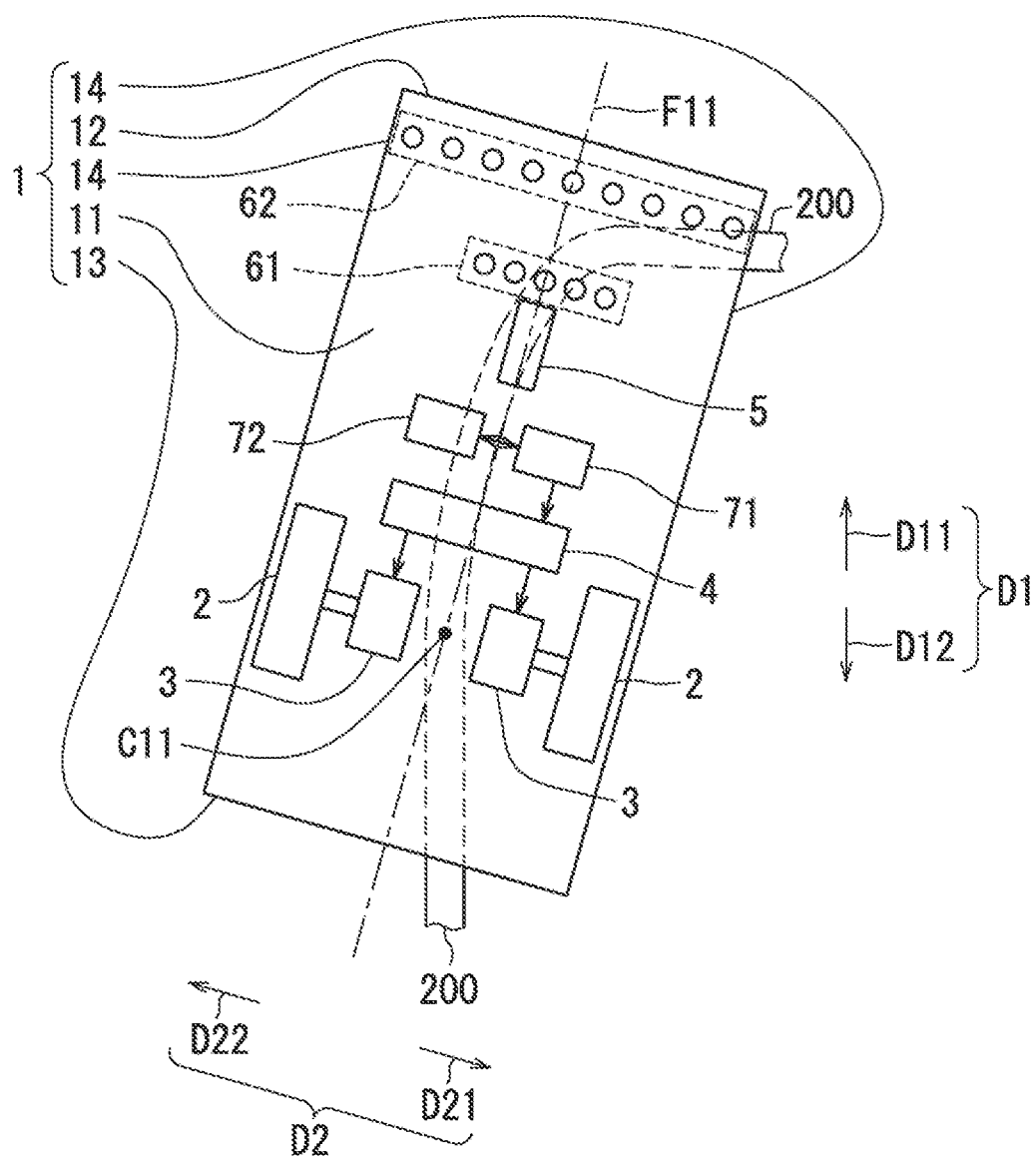
FIG. 5 is a diagram illustrating the traveling apparatus traveling on a curve of the guide.
Figure 6:
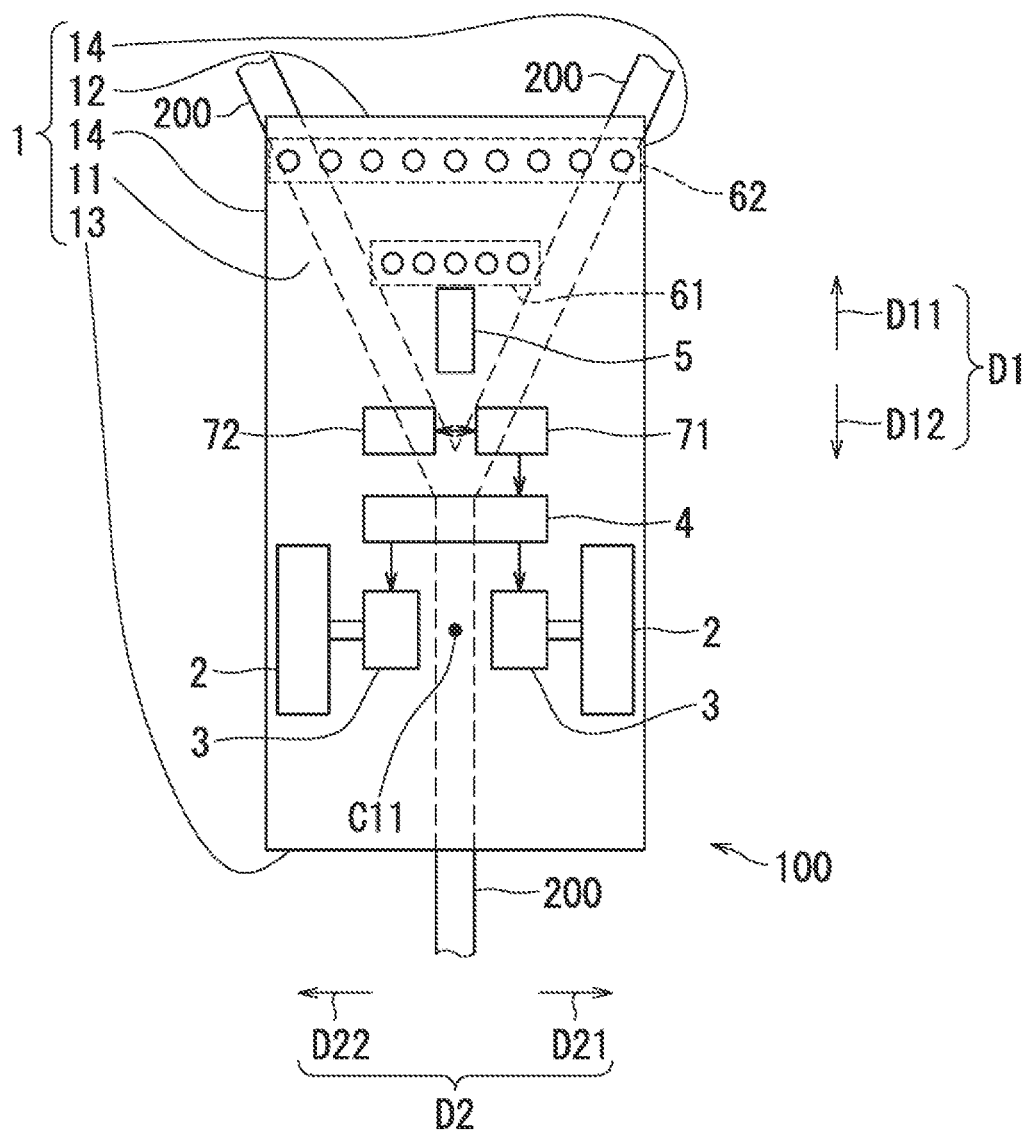
FIG. 6 is a diagram illustrating the traveling apparatus located at a fork in a guide 200.

FIG. 3 is a flowchart illustrating a procedure of guided travel control by the controller 71 illustrated in FIG. 2. FIG. 4 is a diagram illustrating the traveling apparatus 100 traveling on a linear section of the guide 200. FIG. 5 is a diagram illustrating the traveling apparatus 100 traveling on a curved section of the guide 200. FIG. 6 is a diagram illustrating the traveling apparatus 100 located at a fork in the guide 200. Operations of the traveling apparatus 100 are described below with reference to FIGS. 1 through 6.

As illustrated in FIG. 3, the guided travel control contains steps S101 through S109.

The controller 71 periodically performs step S101. In step S101, the controller 71 acquires all detection results.

In step S102, the controller 71 takes, from among the detection results acquired in step S101, the first detection results as targets for processing. The controller 71 determines whether a first detection result with the "Hi" level is present among the targets for processing in step S102. If it is determined that the first detection result with the "Hi" level is present (YES in step S102), the processing proceeds to step S103. If it is determined that the first detection result with the "Hi" level is not present (NO in step S102), the processing proceeds to step S104.

In step S103, the controller 71 exerts the guided travel control of the traveling apparatus 100 based on the first detection results. Specifically, the controller 71 outputs, to the driver 4, a control signal for causing the traveling apparatus 100 to move straightforward along the guide 200. The driver 4 outputs driving signals to the motors 3, respectively, based on the control signal. A well-known technology or a known technology will do for step S103, so that a detailed description is not made on step S103. After performing step S103, the controller 71 performs step S101.

In step S104, the controller 71 takes, from among the detection results acquired in step S101, the second detection results as targets for processing. The controller 71 determines whether the second guide detection unit 62 is located above a curve of the guide 200. To be specific: In step S104, it is determined whether one of Conditions (1) and (2) below is met. Condition (1) is a condition that only one second detection result with the "Hi" level is included in the targets for processing in step S104. Condition (2) is a condition that the targets for processing in step S104 only include the second detection results with the "Hi" level, which are sent from two second detectors 621 adjacent to each other in the intersectant direction D2.

If one of Conditions (1) and (2) is met, the controller 71 determines that the second guide detection unit 62 is located above a curve of the guide 200 (YES in step S104), and the processing proceeds to step S105. If neither of Conditions (1) and (2) is met, the processing proceeds to step S106.

In step S105, the controller 71 exerts the guided travel control of the traveling apparatus 100 based on the second detection results. During the guided travel control in step S105, the controller 71 controls the travel of the traveling apparatus 100 based on the result of detection by the second detectors 621 and a position of the turn center C11 if none of the first detectors 611 detects the guide 200. To be specific: An angular position in a circumferential direction about the turn center C11 is set in advance for each second detector 621. The angular position is set on the basis of the median plane F11. For instance, the second detector 621, which is closest to the right D21, is in an angular position θ11 on the basis of the median plane F11 (see FIG. 4). In step S105, the controller 71 finds a turning-angular velocity. If one second detection result with the "Hi" level is present, the turning-angular velocity is found by multiplying the angular position of the sender, which has sent the second detection result, by a coefficient. If two adjacent second detection results with the "Hi" level are present, the turning-angular velocity is found by multiplying an intermediate position between the angular positions of the two senders by a coefficient. The controller 71 outputs, to the driver 4, a control signal for causing the traveling apparatus 100 to make a normal turn at the turning-angular velocity as found. The driver 4 outputs driving signals to the motors 3, respectively, based on the control signal. As a result, the traveling apparatus 100 makes a normal turn so as to allow the first guide detection unit 61 to detect the guide 200 (see FIG. 5).

According to the embodiment, the interval P12 between the second detectors 621 is larger than the interval P11 between the first detectors 611, so that the second detectors 621, each of which outputs the second detection result with the "Hi" level, are reduced in number. Consequently, the turning-angular velocity is easy to find, and a traveling apparatus that stably travels on a curved section is manufactured at a low cost. The second detectors 621 do not stand in multiple rows but in a row, which reduces the total number of second detection results that the controller 71 sets as targets for processing. As a result, processing load on the controller 71 is reduced.

In step S105, the controller 71 outputs, to the driver 4, a control signal for causing the traveling apparatus 100 to travel toward the front D11 in the travel direction D1 at a relatively high translation speed, if a second detector 621 near the median plane F11 outputs the second detection result with the "Hi" level. The reason is that, in such case, the guide 200 is close to a center of the second guide detection unit 62 and deviation is less liable to occur even if the guide 200 is somewhat displaced left or right. In contrast, the controller 71 outputs, to the driver 4, a control signal for causing the traveling apparatus 100 to travel toward the front D11 in the travel direction D1 at a relatively low translation speed, if a second detector 621 distant from the median plane F11 outputs the second detection result with the "Hi" level. The reason is that, in such case, the guide 200 is close to an end of the second guide detection unit 62 and deviation is more liable to occur. The translation speed is appropriately set for each second detector 621. After performing step S105, the controller 71 performs step S101.

If the traveling apparatus 100 is caused to turn, a delay called transmission delay or time lag is generated. The coefficient has a value less than 1 in order to correct the delay. If a second detector 621 near the median plane F11 outputs the second detection result with the "Hi" level, the coefficient is set so that the median plane F11 may slowly be caused to go along the guide 200. If the guide 200 is distant from the median plane F11, the coefficient is set so that the median plane F11 may quickly be caused to go along the guide 200.

In step S106, the controller 71 determines whether the second detection results as taken in step S104 as targets for processing meet Condition (3) below, in order to determine whether the second guide detection unit 62 is located above branches of the guide 200 (see FIG. 6). Condition (3) is a condition that two or more second detectors 621 separated from one another in the intersectant direction D2 each output the second detection result with the "Hi" level. If Condition (3) is met (YES in step S106), the processing proceeds to step S107. If Condition (3) is not met (NO in step S106), the processing proceeds to step S109.

In step S107, the controller 71 determines whether it is possible to specify the number of branches in the guide 200. Specifically, the controller 71 determines whether Condition (4) below is met. In the embodiment, the interval P12 is 4 cm and the width W11 of the guide 200 is 5 cm. Therefore, if three or more second detectors 621 adjacent to one another in the intersectant direction D2 each output the second detection result with the "Hi" level, it is not possible to specify the number of branches. Consequently, Condition (4) is a condition that not all three or more second detectors 621 adjacent to one another in the intersectant direction D2 output the second detection result with the "Hi" level. If Condition (4) is met, the controller 71 determines that it is possible to specify the number of branches in the guide 200 (YES in step S107), and performs step S108. If Condition (4) is not met, the controller 71 determines that it is not possible to specify the number of branches in the guide 200 (NO in step S107), and performs step S109.

In step S108, the controller 71 selects a second detection result that specifies one out of multiple branches. A well-known technology or a known technology will do for a method for specifying a branch, that is to say, the method for specifying a branch is as follows, for instance: In a radio frequency identification (RFID) tag previously provided on the periphery of a fork in the guide 200, information designating a branch that the traveling apparatus 100 is to advance onto is stored. The traveling apparatus 100 reads the information from the RFID tag so as to specify the branch, onto which the traveling apparatus 100 is to advance.

In step S108, the controller 71 further exerts the guided travel control of the traveling apparatus 100 based on the selected second detection result or results. The guided travel control in step S108 is the same as the guided travel control in step S105 and is, accordingly, not described anew. After performing step S108, the controller 71 performs step S101. Since the first guide detection unit 61 has a short length in the intersectant direction D2, the first guide detection unit 61 may not detect a branch of the guide 200 alone. The traveling apparatus 100 also includes the second guide detection unit 62, so that it is more possible to detect a branch of the guide 200 (see FIG. 6).

In step S109, the controller 71 determines that the traveling apparatus 100 has deviated from the guide 200, and makes an emergency stop, for instance, before ending the guided travel control.

Figure 7:
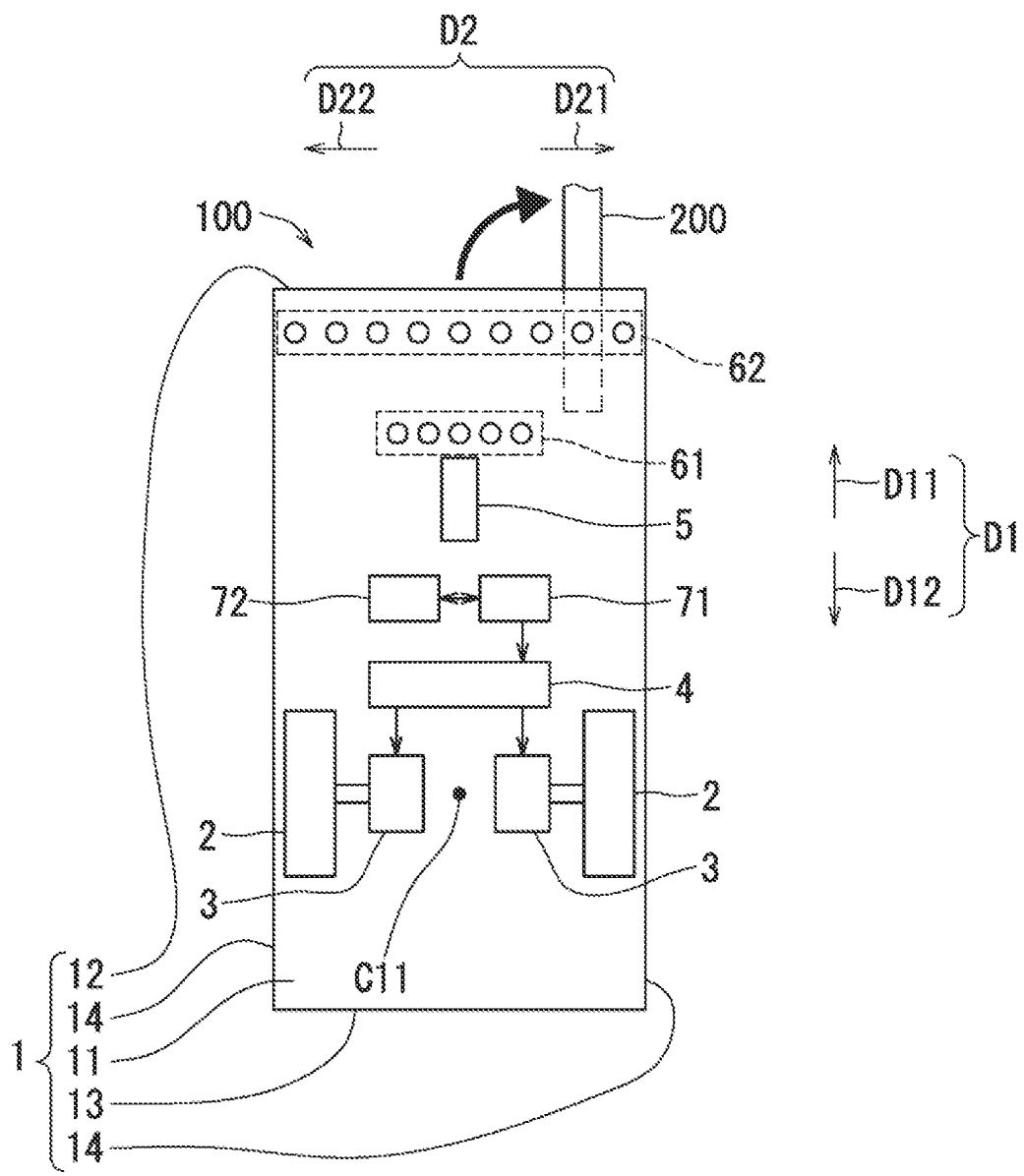
FIG. 7 is a diagram illustrating the traveling apparatus, whose guideless travel control is transferred to the guided travel control.

FIG. 7 is a diagram illustrating the traveling apparatus 100, whose guideless travel control is transferred to the guided travel control. Referring to FIGS. 1, 2, and 7, the description below is made on the transfer of the guideless travel control of the traveling apparatus 100 to the guided travel control.

The controller 71 exerts the guideless travel control. During the guideless travel control, the controller 71 outputs, to the driver 4, a control signal for causing the traveling apparatus 100 to travel, while estimating the position of the traveling apparatus 100 and detecting an obstacle around the traveling apparatus 100 based on the result of detection by the guideless travel detection unit 8 and the map data 722. When exerting the guideless travel control, the controller 71 causes at least the second guide detection unit 62 to operate. In response to the acquisition of the second detection result with the "Hi" level from some second detector 621 or other, the controller 71 transfers to the guided travel control based on the second detection result (see FIG. 3). In the guideless travel control, an accurate travel, such as travel on a narrow path and a sideways movement to an apparatus, may be hard to carry out due to an error in position estimation or an error in measuring the distance to an obstacle. On the other hand, a guided travel is the travel along the guide 200 bonded on the ground, so that a high accuracy is easily achieved by the guided travel control. Since the first guide detection unit 61 has a narrow width, the accuracy of position estimation for a guideless travel may make the capture of the guide 200 difficult. The use of the second guide detection unit 62, which has a wide width, brings about a certain capture of the guide 200 even if a minor error of position estimation is generated in the course of the guideless travel. As a result, the traveling apparatus 100 is able to travel in a wide region in the factory or the warehouse.

Figure 8:
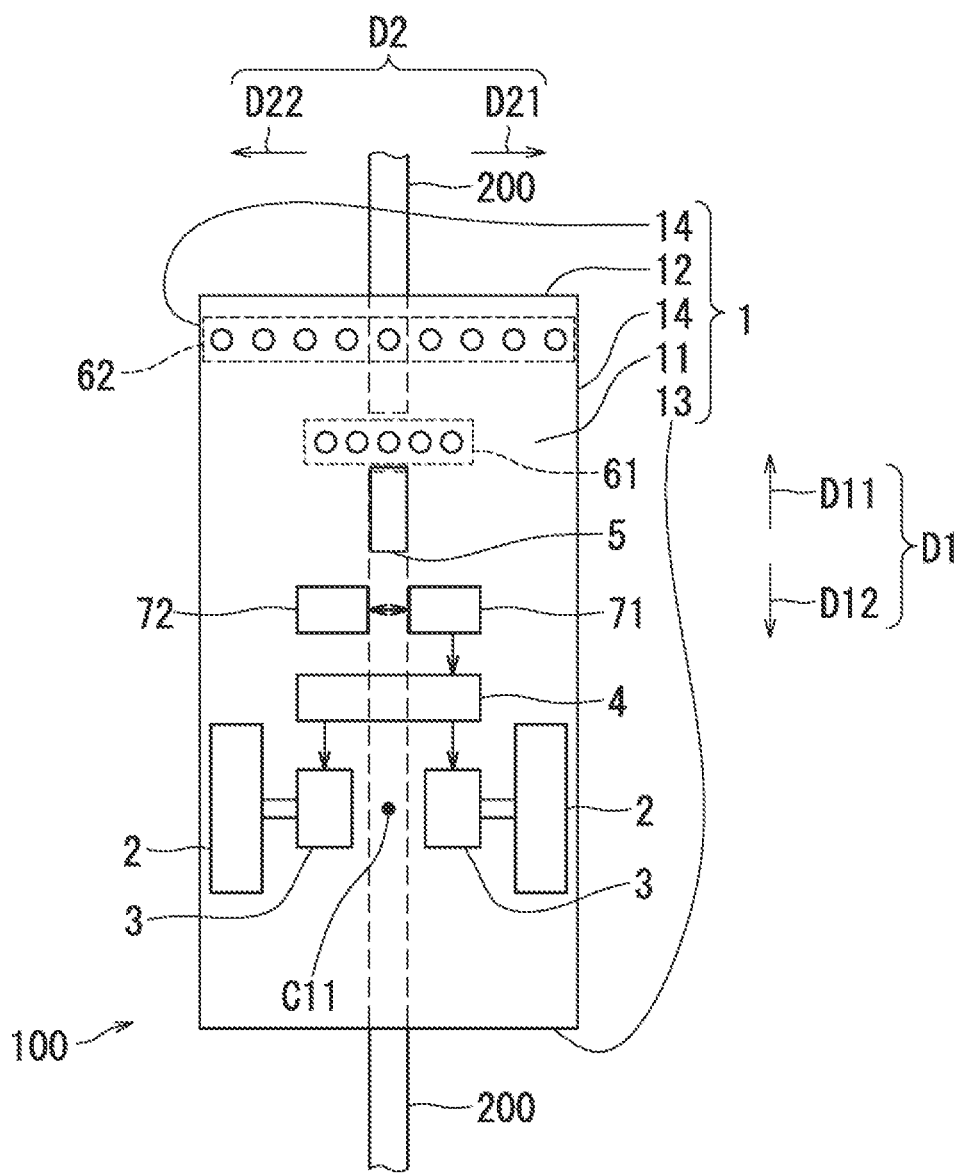
FIG. 8 is a diagram illustrating the traveling apparatus traveling on a broken portion of the guide 200.

FIG. 8 is a diagram illustrating the traveling apparatus 100 traveling on a broken portion of the guide 200. As illustrated in FIG. 8, the second guide detection unit 62 is provided on the traveling apparatus 100 toward the front D11 as compared with the first guide detection unit 61. Therefore, either the first guide detection unit 61 or the second guide detection unit 62 detects the guide 200 even if the guide 200 is broken due to aging or seams of the floor surface, which makes the deviation less liable to occur.

Figure 9:
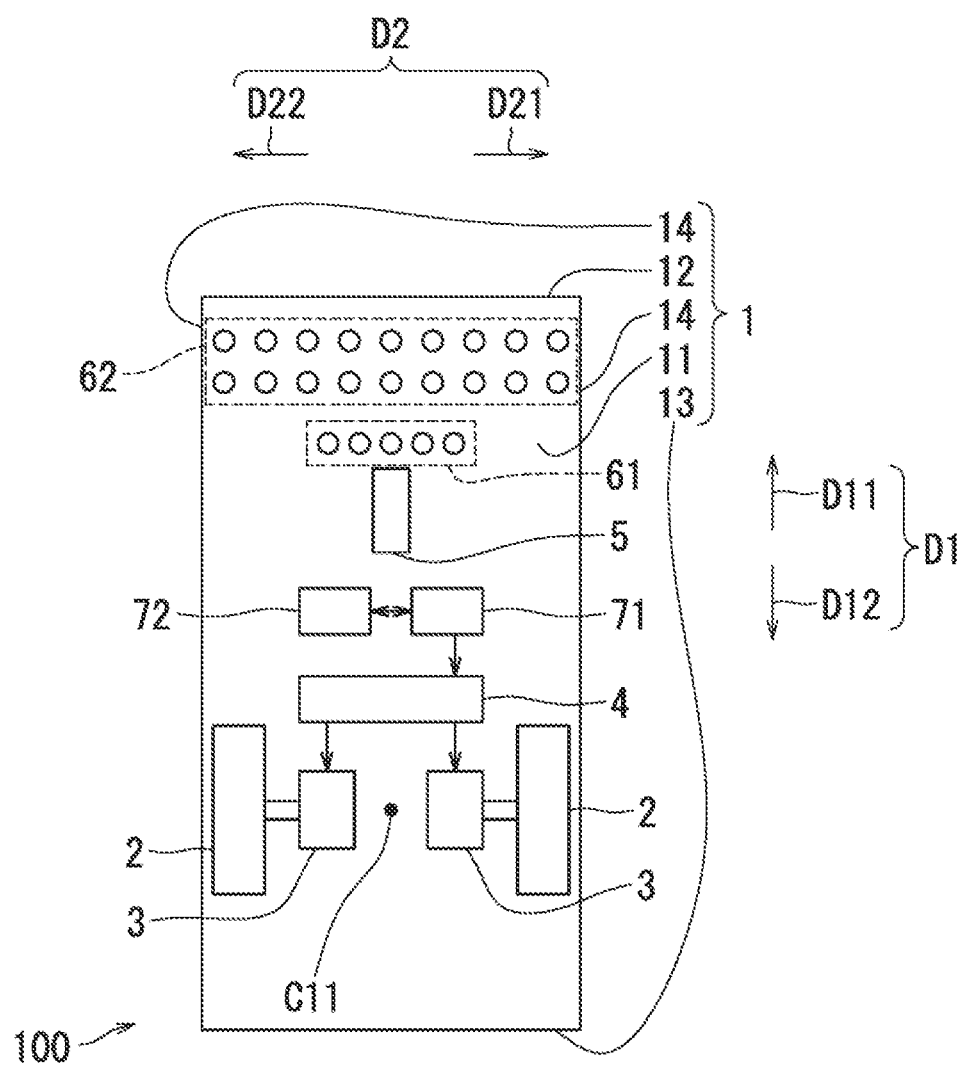
FIG. 9 is a diagram illustrating a first modification of the traveling apparatus illustrated in FIG. 1.

FIG. 9 is a diagram illustrating a first modification of the traveling apparatus 100 illustrated in FIG. 1. As illustrated in FIG. 9, the first modification is different from the embodiment in that multiple second detectors 621 in a second guide detection unit 62 stand in two rows in the intersectant direction D2. According to such configuration, the possibility that one of the first detectors 611 included in the first guide detection unit 61 or one of the second detectors 621 included in the second guide detection unit 62 detects the guide 200 even if the guide 200 is broken is made greater, which makes the deviation less liable to occur. The second detectors 621 may stand in three or more rows.

Figure 10:
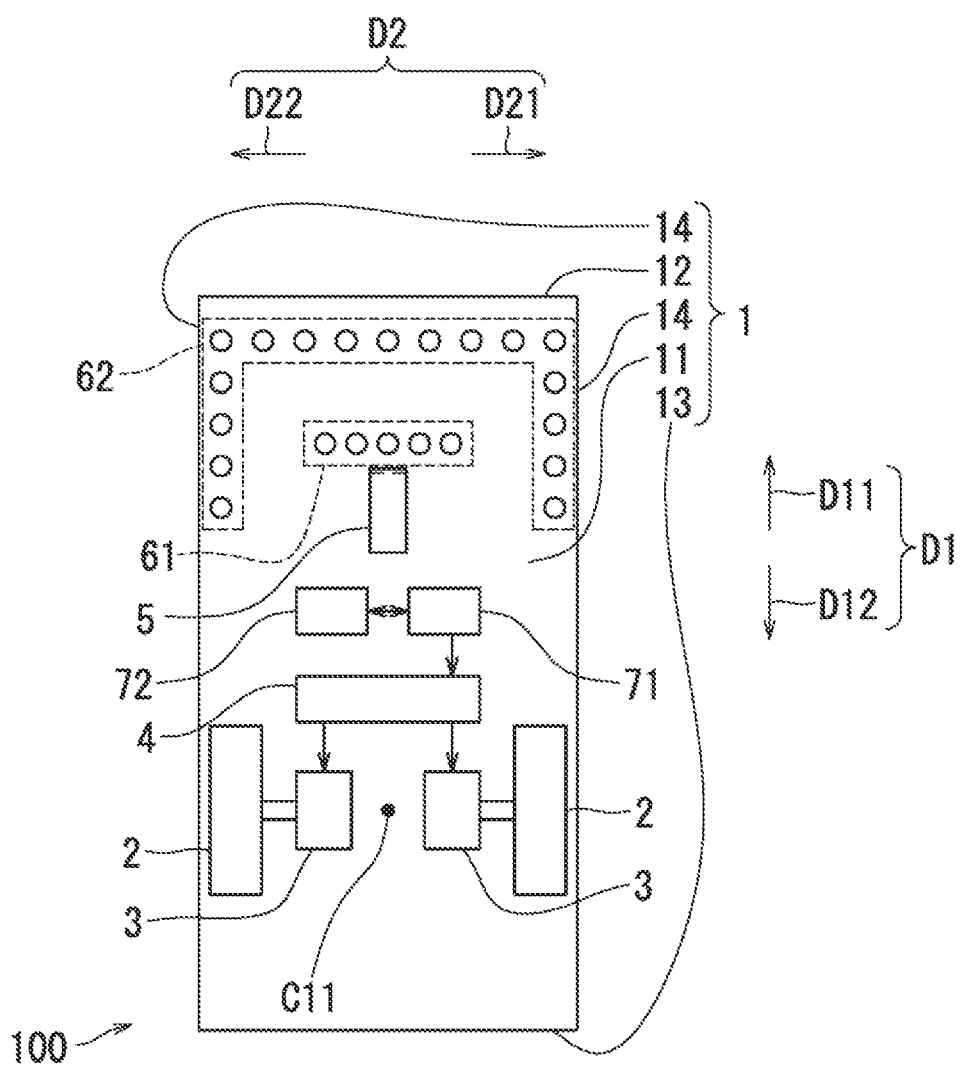
FIG. 10 is a diagram illustrating a second modification of the traveling apparatus illustrated in FIG. 1.

FIG. 10 is a diagram illustrating a second modification of the traveling apparatus 100 illustrated in FIG. 1. As illustrated in FIG. 10, the second modification is different from the embodiment in that part of multiple second detectors 621 in a second guide detection unit 62 are arrayed along an edge on the right D21 of the bottom face 11 up to a position closer to a rear than the first guide detection unit 61, and another part of the second detectors 621 are arrayed along an edge on the left D22 of the bottom face 11 up to a position closer to the rear than the first guide detection unit 61. Such configuration makes the second guide detection unit 62 capable of detecting the guide 200 in a wide region. In addition, the second guide detection unit 62 is capable of detecting a curve with a large curvature of the guide 200. In the second modification, the second detectors 621 may be arrayed on the bottom face 11 in the form of a circular arc.

Figure 11:
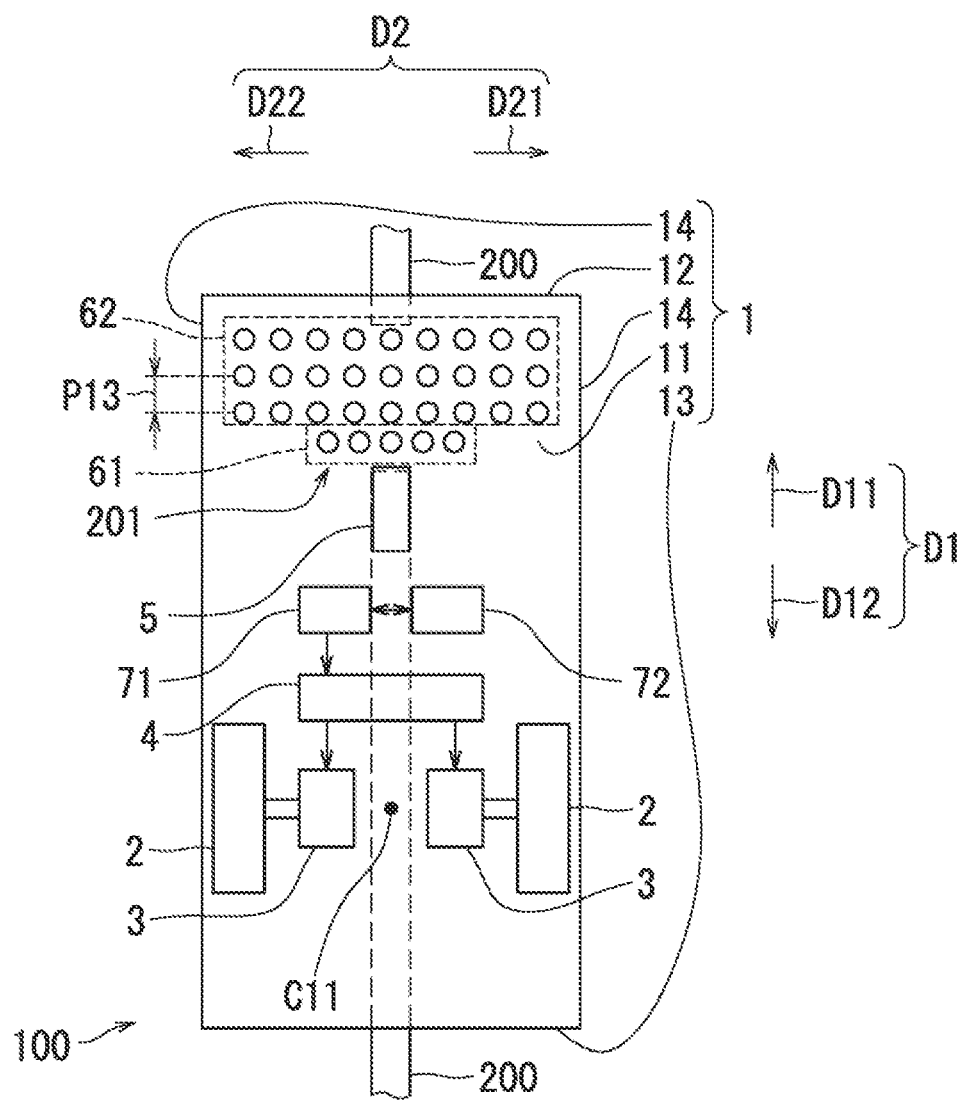
FIG. 11 is a diagram illustrating a third modification of the traveling apparatus illustrated in FIG. 1.

FIG. 11 is a diagram illustrating a third modification of the traveling apparatus 100 illustrated in FIG. 1. As illustrated in FIG. 11, the third modification is different from the embodiment in that multiple second detectors 621 are arrayed in a direction to the front D11, which direction is included in the travel direction D1, and the intersectant direction D2 in a planar form. Two second detectors 621 adjacent to each other in the travel direction D1 are arrayed with an interval P13.

According to the third modification, the controller 71 detects a moving speed of the traveling apparatus 100 if the traveling apparatus 100 travels on a broken portion of the guide 200. Specifically, the controller 71 measures time t from a first point of time to a second point of time. The first point of time is a point of time when the second detection result of one of two second detectors 621 adjacent to each other in the travel direction D1 has transferred from the "Hi" level to the "Lo" level. The second point of time is a point of time when the second detection result of the other second detector 621 has transferred from the "Hi" level to the "Lo" level. The controller 71 divides the interval P13 by the measured time t so as to find a moving speed v.

The controller 71 may find the moving speed v using the following measures. To be specific: A moving speed v1 is calculated based on second detection results of second detectors 621 in a first row and a second row in the travel direction D1. A moving speed v2 is found based on second detection results of second detectors 621 in the second row and a third row in the travel direction D1. The controller 71 finds a mean value of the moving speeds v1 and v2 as the moving speed v of the traveling apparatus 100. Thus, the moving speed v is found with high accuracy.

In the third modification, the second detectors 621 are arrayed in a planar form. As a result, the traveling apparatus 100 smoothly travels along a curve of the guide 200 under the control by the controller 71, as is the case with the embodiment. Moreover, the traveling apparatus 100 is capable of recognizing a portion of the guide 200 that is bent at right angles or a T-junction in the guide 200. In this regard, the controller 71 outputs a control signal to the driver 4 so that the traveling apparatus 100 may make a fixed position turn in response to the arrival of the turn center C11 of the traveling apparatus 100 at a corner of the guide 200.

In addition to the above, a magnetic tape the same in material as the guide 200 is used to provide a one-dimensional code (namely, a bar code) on the floor surface next to a linear portion of the guide 200. The one-dimensional code represents simple information, such as a current position and a speed limit, of the traveling apparatus 100 based on the size in the travel direction D1 of the traveling apparatus 100. The controller 71 reads the bar code with the second guide detection unit 62 while exerting the guided travel control along the guide 200.

Figure 12:
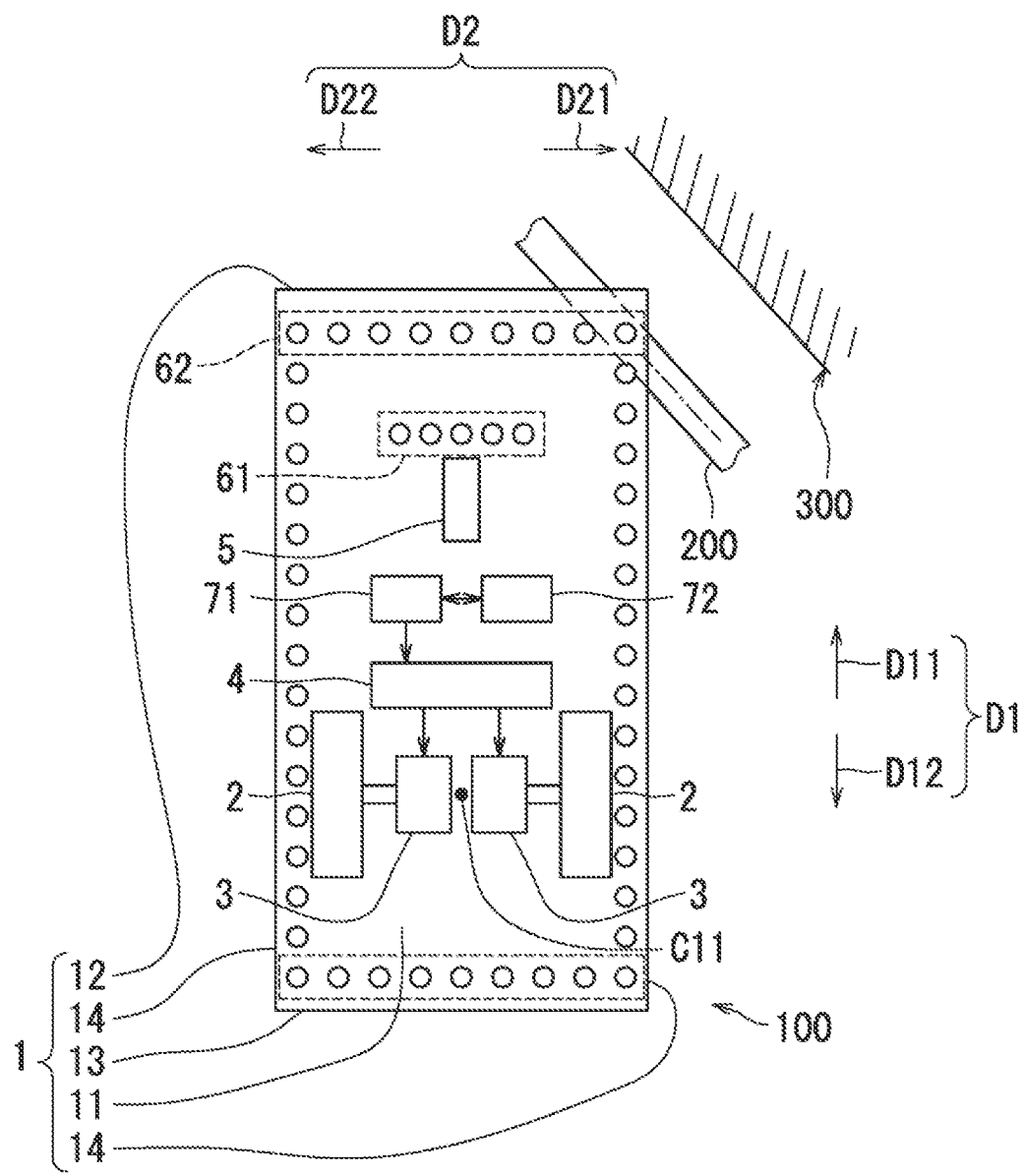
FIG. 12 is a diagram illustrating a fourth modification of the traveling apparatus illustrated in FIG. 1.

FIG. 12 is a diagram illustrating a fourth modification of the traveling apparatus 100 illustrated in FIG. 1. As illustrated in FIG. 12, multiple second detectors 621 in a second guide detection unit 62 are arrayed along the front edge and a rear edge in the travel direction D1 as well as the edge on the right D21 and the edge on the left D22 in the intersectant direction D2 of the bottom face 11 of the vehicle body 1. Consequently, the controller 71 exerts guided travel control similar to the guided travel control in the embodiment even if the traveling apparatus 100 is capable of traveling toward a rear D12 in the travel direction D1.

As illustrated in FIG. 12, a special area 300 where the traveling apparatus 100 is unable to travel is settled in advance in the factory or the warehouse. In a position at a certain distance outside from the special area 300, a regulation line is laid with a magnetic tape the same in material as the guide 200. In the description below, the regulation line is given a reference sign "200". Also in the fourth modification, the controller 71 causes at least the second guide detection unit 62 to operate while exerting the guideless travel control. The controller 71 recognizes the position of the special area 300 by the area data 7221 included in the map data 722 (see FIG. 2). The controller 71 outputs, to the driver 4, a control signal for causing the traveling apparatus 100 to stop or move rearward, in response to the fact that the regulation line 200 has been detected in the position at the certain distance from the recognized special area 300, based on the second detection result.

Figure 13:
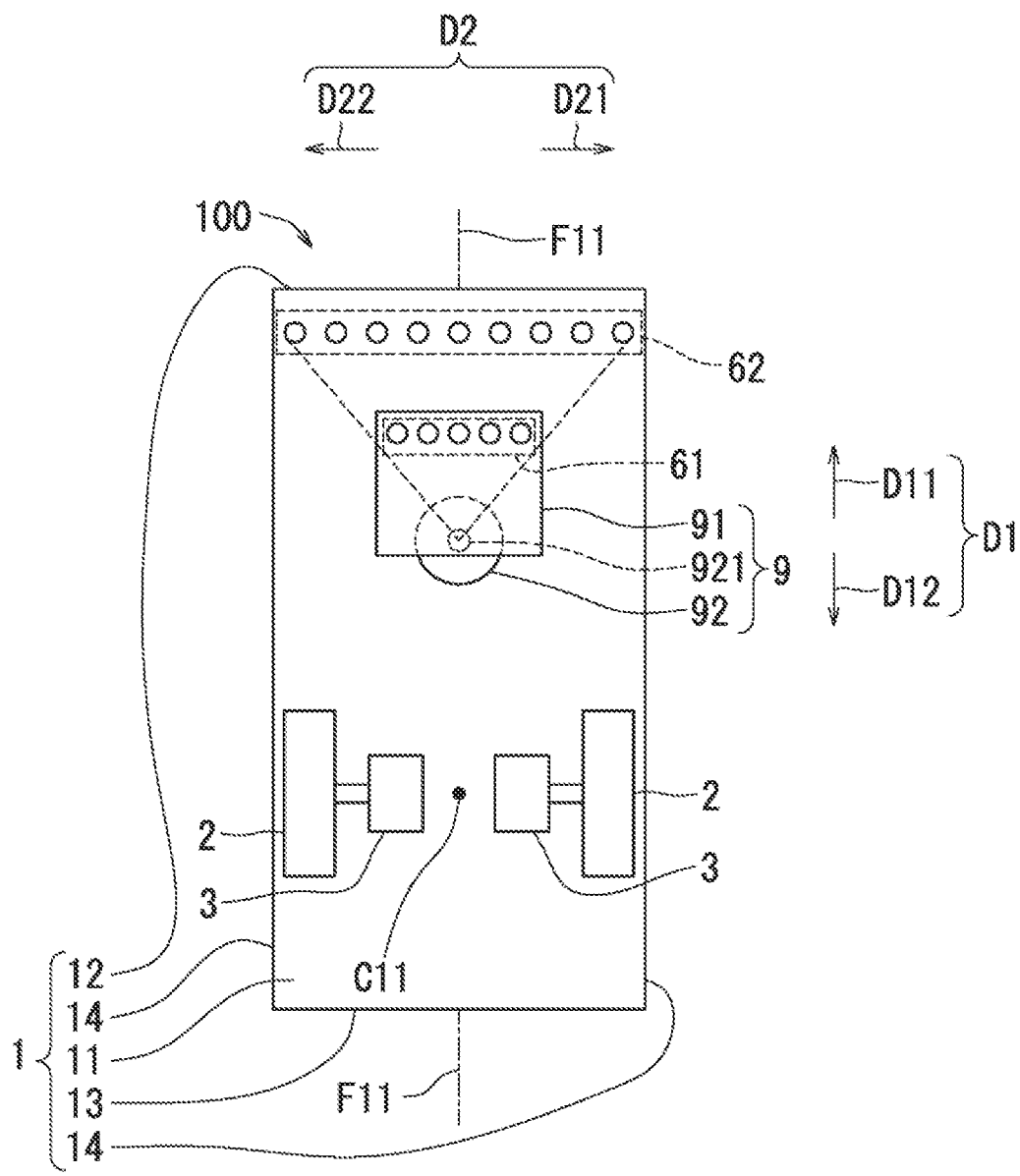
FIG. 13 is a diagram illustrating a fifth modification of the traveling apparatus illustrated in FIG. 1.

FIG. 13 is a diagram illustrating a fifth modification of the traveling apparatus 100 illustrated in FIG. 1. For convenience, the driver 4, the auxiliary wheel 5, and the controller 71 are not illustrated in FIG. 13. As illustrated in FIG. 13, the traveling apparatus 100 further includes a rotation mechanism 9. The rotation mechanism 9 rotates the first guide detection unit 61 along the floor surface, on which the guide 200 is provided.

To be specific: The rotation mechanism 9 includes a base plate 91 and a motor 92. The motor 92 is a stepping motor, for instance, and is provided in the internal space of the vehicle body 1. The motor 92 has a motor shaft 921 rectangularly protruding from a specified position on the bottom face 11 toward the floor surface. The specified position is any position on a line of intersection of the bottom face 11 and the median plane F11. As an example, the specified position is a position closer to the front face 12 than to the rear face 13. In addition, the specified position may be the same as the position of the turn center C11 in the travel direction D1.

The base plate 91 is a flat plate extending in the travel direction D1 and the intersectant direction D2 on the bottom face 11. The base plate 91 is not particularly limited in planar shape but is rectangular or fan-shaped, for instance. The base plate 91 is coupled to the motor shaft 921 and extends toward the front D11 in the travel direction D1. The base plate 91 as such rotates in a circumferential direction of the motor shaft 921.

The first detectors 611 stand in a row on the base plate 91 in a position toward the front D11 as compared with the motor shaft 921. The position in the circumferential direction of the base plate 91, in which position the first detectors 611 symmetrically stand in a row in the intersectant direction D2, is hereinafter referred to as "a standard position".

In the fifth modification, under the guided travel control exerted by the controller 71, the base plate 91 has stopped in the standard position when the traveling apparatus 100 travels on a linear section of the guide 200. The controller 71 causes the base plate 91 to rotate in the circumferential direction if Condition (5) below is met. Specifically, Condition (5) is a condition that the first guide detection unit 61 does not detect the guide 200 and, at the same time, one or two out of the second detectors 621 output the second detection result with the "Hi" level. The controller 71 decides the amount of rotation of the motor shaft 921 so that, among the first detectors 611, the first detector 611 at the center may be directed toward a second detector 621 that outputs the second detection result with the "Hi" level.

The controller 71 rotates the motor 92 based on the decided amount of rotation. Subsequently, the controller 71 recognizes, from a detection result sent from a rotary encoder provided on the motor 92, that the motor 92 has rotated in the decided amount of rotation. After that, the first guide detection unit 61 is able to detect the guide 200, so that the controller 71 exerts the guided travel control of the traveling apparatus 100 based on the first detection results (see step S103 in FIG. 3).

In the fifth modification, the result of detection by the second guide detection unit 62 is used to cause the first guide detection unit 61 to operate, so that travel control with the first guide detection unit 61 is always possible. The first guide detection unit 61 is higher in detector density than the second guide detection unit 62 and thus allows a more accurate control.

The embodiment of the present disclosure has been described above with reference to the drawings. The present disclosure, however, is not limited to the above embodiment but carried out in various modes without departing from the gist of the present disclosure. The components, which are disclosed in the above embodiment, can appropriately be combined with one another so as to form various disclosures. For instance, some components may be eliminated from the whole components in the embodiment. For an easier understanding, the drawings chiefly illustrate the respective components in a schematic manner, and the number or the like of the respective components as illustrated may be different from actual one for convenience of drawing preparation. The respective components in the above embodiment are each an example and are not particularly limited, and various changes can be made essentially within the range of effects of the present disclosure.

In the embodiment, the guide 200 is constituted of a magnetic tape, and the first detectors 611 and the second detectors 621 are each a magnetic sensor. The present disclosure, however, is not limited to such configuration, and the guide 200 may be constituted of a light-reflective tape. In that case, the first detectors 611 and the second detectors 621 are each an optical sensor.

What is claimed is:

1. A traveling apparatus comprising:
   a vehicle body;
   a plurality of first detectors that is arrayed in an intersectant direction intersecting a travel direction where the vehicle body travels, and that is capable of detecting a guide extending on a road surface;
   a plurality of second detectors that is arrayed in the intersectant direction in a position distant, in the travel direction, from the plurality of first detectors and that detects the guide; and
   a controller that exerts guided travel control to control a traveling of the vehicle body based on a result of the detections by the plurality of first detectors and the plurality of second detectors,
   wherein a first interval between two first detectors out of the plurality of first detectors, that are adjacent to each other in the intersectant direction, is smaller than a second interval between two second detectors out of the plurality of second detectors, that are adjacent to each other in the intersectant direction,
   among the plurality of second detectors, a second detector at an end in the intersectant direction is located outward in the intersectant direction with respect to the plurality of first detectors, and
   when the plurality of first detectors does not detect the guide, the controller calculates a turning-angular velocity, based on an angular position of a second detector, included in the plurality of second detectors, that detects the guide, in relation to a reference point representing a turn center of the vehicle body, with reference to a median plane extending in, and passing through, the travel direction, and controls the traveling of the vehicle body such that to turn the vehicle body at the turning-angular velocity.

2. The traveling apparatus according to claim 1, wherein the second interval is smaller than a width of the guide.

3. The traveling apparatus according to claim 1, wherein the plurality of second detectors is arrayed along a front end in the travel direction of the vehicle body.

4. The traveling apparatus according to claim 1, wherein the plurality of second detectors is positioned in a row in the intersectant direction.

5. The traveling apparatus according to claim 1, wherein the plurality of second detectors is positioned in a plurality of rows in the intersectant direction.

6. The traveling apparatus according to claim 3, wherein the plurality of second detectors is arrayed along a rear end in the travel direction, an end in the intersectant direction, and another end in the intersectant direction of the vehicle body.

7. The traveling apparatus according to claim 1, wherein the plurality of second detectors is arrayed along an end and another end in the intersectant direction of the vehicle body up to a rear position in the travel direction with respect to the plurality of first detectors.

8. The traveling apparatus according to claim 1, further comprising a storage that stores map data representing a map of an area where the guide is provided,
   wherein, if the controller controls the travel of the vehicle body based on the map data, the controller starts controlling the traveling of the vehicle body based on a result of the detection by the plurality of second detectors.

9. The traveling apparatus according to claim 8,
   wherein the map data includes area data designating a specific area within the area into which the vehicle body is prohibited from traveling, and
   wherein, if the controller controls the traveling of the vehicle body based on the map data, the controller stops the traveling of the vehicle body based on the area data and the result of the detection by the plurality of second detectors.

10. The traveling apparatus according to claim 1, further comprising a rotation mechanism that rotates the plurality of first detectors along the road surface where the guide is provided,
    wherein the controller decides an amount of rotation of the plurality of first detectors by the rotation mechanism based on a result of the detection by the plurality of second detectors.

11. The traveling apparatus according to claim 1, wherein both the plurality of first detectors and the plurality of second detectors are provided on a bottom surface of the vehicle body.

12. The traveling apparatus according to claim 1, wherein both the plurality of first detectors and the plurality of second detectors are magnetic sensors.

* * * * *